United States Patent Office 3,642,740
Patented Feb. 15, 1972

3,642,740
PROCESS FOR PREPARING HOMO- AND COPOLYMERS OF VINYL CHLORIDE IN AQUEOUS EMULSION
John K. Pierce, Jr., Baytown, Tex., assignor to Diamond Shamrock Corporation, Cleveland, Ohio
No Drawing. Filed Sept. 23, 1968, Ser. No. 761,861
Int. Cl. C08f 1/13, 1/88, 3/30
U.S. Cl. 260—87.5
11 Claims

ABSTRACT OF THE DISCLOSURE

Vinyl chloride homo- and copolymers are prepared in aqueous emulsion, utilizing as the emulsifier system therein, from 0.25 percent to 0.45 percent of an alkali metal salt of a sulfated fatty alcohol having from 8–18 C atoms per molecule or an ether derivative thereof; from 0.15 percent to 2.0 percent of a tallow fatty alcohol or an epoxidized unsaturated fatty acid oil; and from 0.10 percent to 0.20 percent of a complex organic phosphate ester or salt derivative thereof, the percentages of these ingredients being based on the weight of the monomer. The paste resin products obtained find particular utility as molding resins, being characterized by excellent clarity, thermal stability, and negligible moisture-sensitivity. Plastisols of these products exhibit excellent dispersion rheology and air-release properties.

BACKGROUND OF THE INVENTION

This invention relates to improvements in the aqueous emulsion polymerization of ethylenically unsaturated monomers, especially vinyl chloride, either alone, or in admixture with other unsaturated monomers polymerizable therewith. More particularly, this invention relates to improvements in the production of vinyl polymers known as paste resins. Still more particularly, it relates to the production of vinyl chloride paste resins having particular utility for the fabrication of various plastic molded articles of excellent quality.

In order to simplify the presentation of the invention, it is desired to dispense with the use of terms such as "copolymers," "interpolymers," "terpolymers," "copolymerization," and the like. Accordingly, it is to be understood that, where the words "polymer," "polymeric," "polymerization," etc., are used, these words are to be understood to extend to and include processes and products wherein more than one monomer is employed in a polymerization reaction to form a copolymer, terpolymer, etc. For example, these terms are intended to include processes and products that employ as little as 50 percent vinyl chloride, with the remainder being one or more additional monomers to form interpolymers, including copolymers and terpolymers.

Moreover, it is likewise to be understood that, as used in the specification and claims, the term "paste resin" is intended to mean the particulate, dry polymer product which is obtained by finishing, as hereinafter described, an aqueous emulsion of said polymer previously prepared in an aqueous emulsion polymerization process. A paste resin so obtained may also be designated by such terms as "emulsion resin," "plastisol resin," and the like.

The art of preparing dispersions of various synthetic resins by the direct polymerization of polymerizable monomeric materials, for example, vinyl chloride, and mixtures thereof, with other polymerizable monomeric materials, in aqueous emulsion in the presence of an emulsifying agent, is well known. The resulting polymerization mass is in the form of a synthetic latex, from which, in the production of paste resins, the polymer is obtained in powder form by precipitation or by other suitable means, such as spray-drying. The dry resin powder may then be incorporated, with stirring, into a liquid organic material which is a plasticizer for the resin. The paste-like polymer dispersion so formed is known as a plastisol. At ordinary room temperature, this composition is fluid in the sense that it can be poured from a container, but is relatively viscous as compared with water. Upon heating the dispersion to an elevated temperature, solvation of the polymer particles by the plasticizer occurs, followed by polymer fusion. When the fused polymer mass is subsequently cooled, a substantially homogeneous body of plasticized synthetic resin is obtained.

Depending upon its particular physical properties, which, in turn, significantly affect its processing characteristics, a plastisol of a vinyl chloride homo- or copolymer may be employed in various processing operations as, for example, extrusion, molding, dip-coating, spread-coating, and the like, to produce tough, durable coatings or comparable molded articles. To perform satisfactorily in molding operations, a plastisol and the vinyl chloride paste resin therein should possess a number of physical characteristics which are extremely important and desirable. Specifically, these properties include, among others, stability of the resin against degradation at elevated temperatures; negligible moisture-sensitivity of the resin; excellent rheology of the plastisol at both low and high shearing stress; and stability of the plastisol in the sense that it does not increase excessively in viscosity at room temperature within a reasonable period of time. It is essential that the plastisol exhibit excellent air-release characteristics so that air entrapped during the preparation thereof may be easily removed prior to molding operations. In many instances, it is also desirable that the molded products which are obtained exhibit a high surface gloss. Of course, it is possible to regulate these properties to some degree in the paste resin product by employing appropriate techniques in the polymerization reaction. However, it has not been possible heretofore to produce, without considerable difficulty, paste resins from which plastisols could be prepared affording all of these several characteristics to the desired degree and at the same time.

In an aqueous emulsion polymerization process, important constituents of the polymerization mixture, aside from the monomer or monomers, include the catalyst and catalyst activator employed to initiate the polymerization reaction and the emulsifier or emulsifier mixture incorporated to prevent flocculation of the polymer. In general, a redox catalyst system is used. This system is well known and may be found described in many U.S. patents as well as numerous publications. Catalyst systems, which typically have been used heretofore in this procedure because of their efficiency and convenience, are combinations of persulfates and bisulfites as, for example, potassium persulfate and sodium metabisulfite. In general, however, any water-soluble peroxide catalyst which can be decomposed at the reaction conditions to form free radicals may be used. Catalyst activators, i.e., reducing agents, which may be used in a redox catalyst system include, for example, sodium bisulfite, sodium formaldehyde sulfoxylate, or other oxidizable sulfoxy compounds including sulfur dioxide, sodium hydrosulfite, sodium thiosulfite and organic oxidizable sulfoxy compounds such as diethyl sulfite, paratoluene sulfinic acid, and the like.

As mentioned previously, another important constituent of the polymerization mixture in an aqueous emulsion polymerization process is the surfactant or emulsifier which serves to prevent flocculation of the polymer as it is formed. Many different classes and types of such materials have been employed heretofore in emulsion polymerization processes in combination with the foregoing described catalysts. However, the paste resin products so produced have not exhibited all of the properties desired for successful molding application.

More recently, a vinyl chloride paste resin product has been prepared, which is thermally stable and exhibits good dispersion viscosity characteristics at both low and high shearing stress, by employing in the polymerization process a hydrogen peroxide catalyst and an alkali metal formaldehyde sulfoxylate activator in combination with certain salts of fatty alcohol sulfates, e.g., sodium tridecyl ether sulfate, sodium tridecyl sulfate, sor sodium lauryl ether sulfate. The preparation of this particular product is described in U.S. Pat. No. 3,317,495 issued May 2, 1967. However, since it does not exhibit all of the desirable characteristics for optimum molding applications, this resin has found more utility as a coating resin.

SUMMARY OF THE INVENTION

An object of the present invention, therefore, is to product a paste resin possessing excellent heat stability coupled with negligible moisture-sensitivity, which paste resin, when dispersed in plasticizer, will provide plastisols exhibiting excellent initial and aged dispersion viscosity characteristics at both low and high shearing stress and which also exhibit excellent air-release properties.

Another object of this invention is to provide a vinyl chloride paste resin, which is particularly adapted to the preparation of various plastic articles, by molding techniques now known in the art.

These and other objects will become apparent to those skilled in the art by the description of the invention which follows.

In accordance with these objects, the present invention is directed to a process for preparing paste resins from vinyl chloride monomer, or from a monomer mixture containing at least 50 percent, by weight, of vinyl chloride, which process comprises polymerizing said monomer or monomer mixture in an aqueous medium at a temperature ranging between 100° and 160° F., in the presence of a free radical-generating catalyst, and, as the emulsifier, a combination of (1) an alkali metal salt of a sulfated fatty alcohol of 8–18C atoms or an etherified derivative thereof, as the primary surfactant; and as secondary surfactants, (2) either a tallow fatty alcohol or an epoxidized unsaturated fatty acid oil; and (3) an anionic complex organic phosphate ester which may be either an alkyl or alkyl phenyl alkoxylated phosphate ester or salt derivative thereof.

By the practice of this invention, employing the emulsifier combination, as described above, a paste resin is produced having excellent resistance to heat degradation, optimum clarity and negligible moisture-sensitivity. Plastisols incorporating this product exhibit excellent initial and aged rheology characteristics at both low and high shearing stress, and possess outstanding air-release properties as well. Moldings of excellent clarity may be prepared from these dispersions, which products are characterized by a smooth, glossy surface. Most important, plastisol formulations with reproducible physical properties typically are prepared from the paste resin product of this invention, regardless of the environmental conditions and/or the length of time it has been stored prior to use.

DESCRIPTION OF THE PREFERRED EMBODIMENTS

As previously described herein, the process of this invention involves the preparation of emulsion vinyl chloride homo- and copolymers, which possess a combination of properties adapting them to the fabrication of plastic articles, by various molding techniques known in the art.

With regard to the catalyst system employed in the process, any redox catalyst system such as previously described herein generally may be used. At present, combinations of potassium persulfate and sodium metabisulfite and, particularly, the hydrogen peroxide-alkali metal formaldehyde sulfoxylate combination are preferred. With the latter catalyst system, the amounts of hydrogen peroxide catalyst and alkali metal, e.g., sodium formaldehyde sulfoxylate activator, used satisfactorily may be varied within relatively wide limits. The activator generally is employed to the extent of from about .003 to 3.0 percent, typically within the range of 0.01 to 0.05 percent, based on the weight of the monomer materials in the reaction charge. In practice, the alkali metal formaldehyde sulfoxylate is usually introduced into the reaction zone with the initial charge. The hydrogen peroxide likewise may be introduced initially but, oftentimes, is introduced continuously or intermittently during the reaction in an amount sufficient to provide the desired reaction rate and rate control. The amount of hydrogen peroxide that generally may be used is 0.002 to 3 percent of the total weight of the monomer charge. However, high conversions of monomer can be realized with minimum induction periods and normal polymerization cycles employing from 0.002 to 0.015 percent of hydrogen peroxide, and this percentage of catalyst is preferred.

With regard to the emulsifier system of this invention, the primary surfactant employed generally may be any one of the alkali metal salts of sulfated fatty alcohols having from 8–18C atoms per molecule and the ether derivatives thereof. These sulfated fatty alcohol salts are commonly designated in the art as "alkyl sulfate surfactants" or as "fatty alcohol sulfates." Suitable compounds of this class include, for example, sodium lauryl sulfate, 2-lauroxy ethyl sodium sulfate (sodium lauryl ether sulfate), 2-tridecyl ethyl sodium sulfate (sodium tridecyl ether sulfate), 2-palmitoxy ethyl sodium sulfate, 2-myristoxy ethyl sodium sulfate, 2-stearoxy ethyl sodium sulfate, 2-capryloxy ethyl sodium sulfate, 2-caproxy ethyl sodium sulfate, and the like. Also suitable are compounds otherwise similar to any of the foregoing fatty ether sulfates but where sodium is replaced by potassium, calcium, barium, ammonium, or alkanol amines of up to six carbon atoms. Of these compounds, sodium lauryl sulfate is the presently preferred surfactant.

Employed essentially as the modifier for the overall surfactant system, and so designated herein, generally may be tallow fatty alcohol or an epoxidized unsaturated fatty acid oil, e.g., epoxidized soybean oil. Such components serve to provide, in combination with the primary surfactant, optimum mechanical stability to the latex throughout the polymerization reaction and also contribute significantly to the development of the desired rheology properties in the resin product. The excellent surface gloss properties of moldings fabricated from the resin, likewise, can be attributed largely to the modifying component. The tallow fatty alcohol, which, as obtained commercially, is primarily a mixture of stearyl and cetyl alcohols, is the presently preferred modifier because of economy and availability. For these reasons, specific reference will be made hereinafter to this specific material. Such reference is not to be taken as limiting the invention, however, but as being merely illustrative thereof.

As the secondary surfactant of the emulsifier system of this invention, an anionic phosphorus-containing organic compound is employed which is generally designated herein as a complex organic phosphate ester or salt derivative thereof. Specifically, this component may be an alkyl alkoxylated phosphate ester, an alkyl phenyl polyalkoxylated phosphate ester, or an alkali metal or alkaline earth metal salt derivative of these esters. These compounds typically are obtained commercially as weak acids. They are prepared generally by esterifying a $C_{8-12}$ alkyl ether alcohol or a $C_{8-12}$ alkyl phenyl polyether alcohol with, e.g., phosphorus oxychloride. Either the mono-, di-, or triesters are suitable, as are their corresponding mono- or di-metallic, e.g., sodium salt derivatives. The ether and polyether portions of the organic moiety of the ester molecule typically are derived from a $C_{2-6}$ alkylene oxide, the polyoxyalkylene chain length ranging from 2 to 30. Specific compounds of this type, which are presently preferred, include, e.g., isooctyl phenyl polyethoxylated phosphate ester, nonyl phenyl polyethoxylated phosphate ester, dodecyl phenyl polyethoxylated phosphate ester, and the linear octyl ethoxylated phosphate monoester, sodium salt. These particular compounds provide, in combination with the primary surfactant and the tallow fatty alcohol modifier, optimum air-release properties and minimum moisture-sensitivity to the paste resin product.

The amounts employed of each of the foregoing described components of the emulsifier system, in the process of this invention, are somewhat critical for the obtention of a paste resin product exhibiting all of the desired properties. For example, the concentration of the primary surfactant, e.g., sodium lauryl sulfate, and the tallow fatty alcohol modifier, in combination, must be sufficient to maintain stability in the latex, even with a comparatively high solids content, throughout the entire polymerization, e.g., for about 12 to 18 hours reaction time. However, such concentration must, at the same time, be insufficient to cause formation of excessive micelles in the emulsion so that the paste resin product will have the proper particle size and distribution to possess excellent dispersion rheologies both at low and high shearing stress. Further, the amount of the tallow fatty alcohol modifier employed is critical inasmuch as this material has a significant effect on the clarity and gloss properties of the resin product.

Finally, the amount of the secondary surfactant, i.e., the complex organic phosphate material, employed is critical since insufficient quantities of this compound will deleteriously affect the air-release properties of the resin and may also promote moisture-sensitivity therein. Conversely, excessive quantities of this component are found to degrade the thermal stability of the resin.

Accordingly, in the practice of this invention, the primary surfactant is employed in an amount ranging from about 0.25 percent to 0.45 percent, preferably from 0.28 percent to 0.40 percent, based on the weight of the monomer charge; the tallow fatty alcohol modifier is used in an amount ranging from 0.15 percent to 2.0 percent, preferably from 0.20 percent to 0.50 percent, based on the weight of the monomer charge; and the complex organic phosphate ester or derivative thereof, i.e., the secondary surfactant, is employed in an amount ranging between 0.10 percent and 0.20 percent, preferably from 0.11 percent to 0.16 percent, based on the total weight of the monomer charge. Further, in the practice of this invention, it has been found advantageous to employ, in any particular polymerization formulation, those amounts of the secondary and primary surfactants, within the previously described ranges, which will provide a ratio of secondary surfactant to primary surfactant of from 0.35 to 0.40:1.00.

The procedure for incorporating the emulsifier components into the polymerization system generally may be accomplished by methods now conventionally practiced for adding such materials in aqueous emulsion polymerization processes. However, in presently preferred practice herein, it has been found advantageous, in most instances, to delay addition of the phosphate surfactant until shortly before the end of the polymerization process. Still more advantageously, addition of this material is delayed until polymerization has been substantially completed, as evidenced by a drop in pressure within the polymerization reactor.

Aside from the emulsifier system employed, the process of this invention is conducted essentially by methods known in the art for carrying out aqueous emulsion polymerization processes. The water to monomer ratio employed varies typically from 1.5 to 2.5:1, with a water to monomer ratio of 1.7 to 2.0:1 being preferred. The polymerization temperature ranges generally from 100° F. to 160° F., with temperatures between 110° F. and 140° F. being preferred.

As will be shown hereinafter by specific examples, the paste resins, produced by the process of this invention, exhibit a combination of properties which make them particularly adaptable as molding resins, particularly by rotational molding and slush molding techniques. These products are characterized by optimum clarity and negligible moisture-sensitivity. Plastisols of these resins exhibit excellent dispersion viscosity characteristics and air-release properties. The molded articles prepared from the dispersions are of high quality, exhibit high surface gloss, and, when desired, are of optimum clarity. Of utmost importance is the fact that the finished paste resin products of this invention contain minimum quantities of residual emulsifiers or soaps, as evidenced by the low values obtained from alcohol extraction tests on these products, i.e., from 0.60 to 0.75 percent methanol extractables typically are recovered. Accordingly, these resins exhibit excellent stability against degradation upon exposure to elevated temperatures during processing.

As indicated hereinabove, the preferred monomer is vinyl chloride. However, copolymers may be advantageously prepared in accordance with this invention. For example, copolymerizable mixtures, containing vinyl chloride and up to 49 percent vinyl acetate, but preferably in the range of 5 to 10 percent vinyl acetate, may be employed. Other monomers copolymerizable with vinyl chloride, which may be used in accordance with this invention, include vinyl esters of other alkanoic acids such as vinyl propionate, vinyl butyrate, and the like; vinyl esters of aromatic acids, e.g., vinyl benzoate; esters of alkenoic acids, for example, those of unsaturated monocarboxylic acids such as methyl acrylate, ethyl acrylate, allyl acrylate, 2-ethyl hexyl acrylate, and the corresponding esters of methacrylic acid; and esters of $\alpha,\beta$-dicarboxylic acids, for example, the methyl, ethyl, propyl, butyl, amyl, hexyl, heptyl, octyl, allyl, methallyl and phenyl esters of maleic, itaconic, fumaric acids, and the like. Amides, such as acrylamide and methacrylamide, and nitriles, such as acrylonitrile, may also be suitably employed.

The following examples are given in order that those skilled in the art may more completely understand the invention and the preferred methods by which the same may be brought into the effect. In these examples and elsewhere herein where proportions of ingredients are given in parts, such proportions are by weight.

EXAMPLE 1

(A) Preparation of polymer seed latex

A suitable polymer seed latex is prepared, utilizing the following materials:

Deionized water—21 gals.
Sodium formaldehyde sulfoxylate—0.022 lb.
Sodium tridecyl sulfate—0.022 lb.
Vinyl chloride monomer—100 lbs.
Hydrogen peroxide—0.008 lb.
Sodium tridecyl sulfate—150 lbs. in 3 gals. of water The water, at ambient temperature, is delivered to a 50-gallon reactor, after which the sodium formaldehyde sulfoxylate and the 0.022 lb. portion of sodium tridecyl sulfate are added and thoroughly mixed with the water by agitation. The reactor is closed, held under vacuum for a short time, and subsequently purged with vinyl chloride to displace the air. The monomer is then charged to the reactor, the temperature of which is then raised, with continuous agitation, to about 110° to 125° F. and to a pressure equivalent to the vapor pressure of the monomer at these temperatures (about 90 to 140 p.s.i.g.). A portion of the hydrogen peroxide is added to initiate the reaction, and the balance is added slowly to maintain the reaction rate. Shortly after polymerization has been initiated, addition of the sodium tridecyl sulfate aqueous solution is begun and continued slowly throughout the reaction cycle. When the reaction has been completed (noted by a pressure drop of 20 to 40 pounds), the remaining monomer is stripped off. In this example, the reaction time is about 4 hours. The contents of the reactor comprise a polymer seed latex, containing approximately 28 to 30 percent solids, by weight.

(B) Preparation of molding paste resin product

Following the same general procedure as outlined in part (A) of this example, similar quantities of deionized water, sodium formaldehyde sulfoxylate, 0.022 pound of sodium lauryl sulfate, 0.22 pound of tallow fatty alcohol, and 8 pounds of the polymer seed latex prepared in part (A) above are charged to the reactor. The vinyl chloride monomer is added after the reactor has been evacuated and purged with vinyl chloride. Of the total amount of hydrogen peroxide used (0.008 pound), a portion is added initially to the reaction and the balance is added incrementally to maintain the reaction rate. When polymerization has been initiated, a solution of 0.4 pound of sodium lauryl sulfate in 3 gallons of water is slowly metered into the reactor throughout the reaction cycle. When the polymerization is completed (reduction of 20–40 pounds in reactor pressure), 0.16 pound of nonyl phenyl polyethoxylated phosphate ester is added to the reactor with agitation, after which agitation of the reactor contents is continued for at least 15 minutes prior to stripping excess monomer from the reactor. The ratio of the phosphate surfactant to sodium lauryl sulfate is 0.40:1.00.

The polymer latex (containing about 32 percent solids) is then recovered, spray-dried, and ground to yield particulate vinyl chloride paste resin.

A plastisol is prepared using 60 parts bis(2-ethyl hexyl phthalate) plasticizer for each 100 parts of the dry resin product. Mixing of the ingredients is carried out in a Hobart mixer for 15 minutes at 25° C.

The viscosity characteristics of this plasitsol at low shearing stress are measured at 25° C., using a Brookfield viscometer (Model RVT–200) with the No. 5 spindle, at 5 r.p.m. Results are as follows:

Plastisol sample: Viscosity-centipoises
    Aged 2 hours _____ 6,880
    Aged 24 hours _____ 8,560

These values indicate that a paste resin product of this invention provides plastisols which exhibit good flow properties at low shear, both shortly after being prepared and after aging.

To determine the dispersion viscosity characteristics of the paste resin product of this example, at high shearing stress, the viscosity of a 2-hour aged plastisol, prepared as described hereinbefore, is measured at 25° C., using a Severs extrusion rheometer (Model A–100) with a medium-sized orifice (0.3 centimeter diameter). Results are as follows:

P.s.i.g.: Viscosity-poises
    100 _____ 66
    60 _____ 75

These values indicate that a paste resin product of this invention provides plastisols with good rheology at high shearing stress.

To determine the air-release properties of the plastisol, a 10 g. sample of freshly prepared material is poured into a 250-ml. breaker, to which vacuum is then applied. The height of the foam layer which develops is measured prior to breaking. Using this procedure, a foam layer of only 2.3 cm. develops prior to being broken with release of the entrapped air. By comparison, a foam layer of approximately 3.5 cm. develops prior to breaking in a similar plastisol formulation of a commercial paste resin product widely used in molding proceses.

For determination of humidity-aging characteristics, quantities of the dry resin product are stored under varying humidity conditions for at least 24 hours. After the storage period, plastisols are prepared from each resin sample as described above. Viscosities of these plastisols are then determined as before, after being aged for 2 hours and 24 hours. Results are as follows:

| Relative humidity storage conditions, percent | Plastisol viscosity, centipoises | |
|---|---|---|
| | Aged 2 hrs. | Aged 24 hrs. |
| 0 | 6,880 | 11,400 |
| 50 | 6,970 | 10,960 |
| 100 | 6,730 | 10,160 |

As evidenced by the minimal differences observed in the above plastisol viscosity readings, the paste resin product of this invention, even after maintenance under widely varying humidity conditions, exhibits negligible moisture-sensitivity.

The heat stability of the paste resin product is determined employing the following formulation:

|  | Parts |
|---|---|
| Resin | 100 |
| Bis(2-ethyl hexyl phthalate) | 60 |
| G–62 [1] | 5 |
| Stabilizer [2] | 3 |

[1] Paraplex G–62—Epoxide Plasticizer (Rohm and Haas).
[2] Stabilizer 6VG–A–Liquid Ba-Cd-Zn Complex (Harshaw Chemical).

This formulation is thoroughly blended in a Hobart mixer, after which the resulting plastisol is deaerated under vacuum. Portions of the plastisol are poured into a sectional tray mold, which is then placed in a circulating-air oven maintained at 375° F. Fused samples are removed from the oven after 20, 30 and 47 minutes exposure. Using this procedure, no significant coloration is observed until the plastisol has been heated for 47 minutes at 375° C.

A portion of the plastisol prepared for the foregoing heat stability test is drawn to a 30-mil film on a glass plate, and is fused by heating in the air-circulating oven for 5 minutes at 350° F. After being cooled, the gloss properties of the film surface are determined with a photovolt gloss meter, utilizing a 60° measuring head and a polished black Carrara glass plate as working standard. Using this procedure, the surface of the film prepared from the resin product of this example exhibits a gloss rating which is 100% of the standard.

EXAMPLE 2

Using the same general procedure as set forth in Example 1, part (A), above, a polymer seed latex is prepared. The polymerization recipe employed is likewise the same, except that, in place of the sodium tridecyl sulfate emulsifier, sodium lauryl sulfate is employed. Initially, 0.22 pound of emulsifier is charged to the reactor and a solution of 1 pound of the sodium lauryl sulfate in 3 gallons of water is slowly added throughout the reaction.

Eight pounds of the polymer seed latex prepared is incorporated in the formulation as outlined in Example 1, part (B), and preparation of the paste resin product is carried out exactly as described previously. Using the same recipe, the ratio of the phosphate surfactant to sodium lauryl sulfate is approximately 0.40 to 1.00. The polymer latex recovered (29.3 percent solids, by weight) is spray-dried and ground to obtain the particulate product.

This paste resin has the following dispersion rheologies determined as previously described:

Plastisol viscosity (low shear):
    2-hour aging—9,000 cps.
    24 hour aging—11,700 cps.
Severs viscosity (high shear):
    100 p.s.i.g.—163 poises
    60 p.s.i.g.—184 poises.

The heat stability of the resin and gloss characteristics of moldings prepared therefrom are equivalent to the resin product of Example 1. As an indication of air-release properties, a plastisol of this resin product develops a foam layer 1.5 cm. in height prior to breaking.

EXAMPLE 3

A paste resin product is prepared following the same general procedure as outlined in Example 1, part (B), and employing the same polymerization recipe with the exception that, in this example, the phosphate surfactant is linear octyl ethoxylated phosphate ester, sodium salt. The polymer seed latex employed is as described in Example 1, part (A).

The particulate resin product obtained exhibits the following dispersion rheologies (plastisol of 100 parts resin, 60 parts plasticizer):

Plastisol viscosity (low shear):
    2-hour aging—9,730 cps.
    24-hour aging—11,620 cps.
Severs viscosity (high shear):
    100 p.s.i.g.—100 poises
    60 p.s.i.g.—125 poises.

The moisture-sensitivity of the resin is found to be negligible as shown by the following viscosity readings of plastisols, formulated from samples of the resin stored in different relative humidity environments, the plastisols being aged 2 hours before viscosities are measured:

| Relative humidity storage conditions (percent): | Plastisol viscosity (centipoises) |
|---|---|
| 0 | 9,730 |
| 50 | 9,970 |
| 100 | 8,000 |

The air-release rating for this resin is 1.7 cm., and the heat stability is equivalent to the product of Example 1.

EXAMPLE 4

A paste resin product of this invention is prepared exactly as described in Example 1, parts (A) and (B), above. In this example, however, 0.14 pound of nonyl phenyl polyethoxylated phosphate ester is employed, resulting in a total ratio of this surfactant to sodium lauryl sulfate of 0.35:1.00.

The product is found to have heat stability, gloss, and air-release properties equivalent to the paste resin product of Example 1.

EXAMPLE 5

Following the same general procedure and polymerization recipe as outlined in Example 1, a paste resin product is prepared. In this example, however, an epoxidized soybean oil (Paraplex G-62 Rohm and Haas) is substituted for the tallow fatty alcohol component used in Example 1, 0.25 pound of the epoxidized component being employed.

This product exhibits heat stability, gloss, and air-release properties equivalent to the product of Example 1. It possesses the following dispersion rheologies, determined as previously described:

Plastisol viscosity (low shear):
    2-hour aging—7,000 cps.
    24-hour aging—9,000 cps.
Severs viscosity (high shear)—100 p.s.i.g.—50 poises.

EXAMPLE 6

Alcohol extraction tests are conducted as follows on the paste resin product of Example 1 and some commercially available vinyl chloride paste resins which are used for molding applications:

For each test, a 12-gram sample of resin is weighed into an extraction thimble of a Soxhlet extraction apparatus, after which 100 ml. of methanol is poured into the tared solvent flask. The apparatus is assembled and the extraction temperature is adjusted to produce at least 6 solvent exchanges per hour. After 6 hours at temperature, the solvent flask is removed and slowly evaporated to dryness over a steam bath. When all apparent solvent has been evaporated, the flask is heated in a 105° C. oven, with weighing at periodic intervals, until a constant weight is reached. The amount of residue extracted is determined by difference between the final weight of the flask and contents and the tare weight of the flask. The percentage of extractable materials is then calculated based on the initial resin weight. Using this procedure repeatedly, the following average results are obtained.

| Resin: | Percent MeOH extractables |
|---|---|
| Product of Example 1 | 0.70 |
| Exon 654 [1] | 2.81 |
| Geon 121 [2] | 3.47 |
| Opalon 410 [3] | 3,52 |
| Vinylite QYLF-2 [4] | 4.93 |

[1] Firestone Plastics Co.
[2] B. F. Goodrich Chemical Co.
[3] Monsanto Chemical Co.
[4] Union Carbide Corp.

As these results show, the paste resin product of this invention contains a significantly lower percentage of methanol extractables than any of the commercially available paste resin products tested. This property can become especially important when considering the possible end-uses of the paste resin of this invention. In molding applications, the reduced soap and additive residues in the resin may assure, for example, the absence of plate-out problems on the molds. Further, the excellent surface gloss and clarity of moldings prepared from the paste resin product of this invention may be due to the extremely low additive residues therein, which low residues are believed to result from the excellent compatability of the emulsifying components used in the polymerization process. The low extractables present in the resin make it especially atrractive to compounders and fabricators processing molding compounds for use in consumer products, e.g., bottle cap linings, etc., since this resin assures them of minimal contamination of their product with polymerization residues.

It is to be understood that although the invention has been described with specific reference to particular embodiments thereof, it is not to be so limited, since changes and alterations therein may be made which are within the full intended scope of this invention as defined by the appended claims.

What is claimed is:

1. In a process in which a monomer selected from the group consisting of vinyl chloride and mixtures thereof with at least one other monomer copolymerizable therewith is polymerized in an aqueous medium with the aid of a water-soluble, free-radical catalyst in the presence of a polymeric seed latex of said monomer and, as the emulsifier, a combination of an alkali metal salt or ether derivative of a sulfated fatty alcohol having 8–18 C atoms per molecule with either tallow fatty alcohol or an epoxidized unsaturated fatty acid oil, and the resulting polymer product is recovered in dry, particulate form by spray drying the polymerization mixture, the improvement which comprises blending with said polymerization mixture upon substantial completion of the polymerization reaction, but prior to the spray drying of said mixture, from 0.10 percent to 0.20 percent, by weight of the initial monomer charge, of an anionic complex organic phosphate ester which is a $C_{8-18}$ alkyl alkoxylated phosphate ester, a $C_{8-12}$ alkyl phenyl polyalkoxylated phosphate ester, or an alkali metal or alkaline earth metal salt derivative of these esters, whereby the dry particulate vinyl chloride polymer obtained exhibits excellent moisture insensitivity, optimum air-release properties, and dispersion viscosity characteristics and is particularly adaptable as a molding paste resin.

2. The process of claim 1 wherein from 0.002 percent to 3 percent, by weight of the monomer, of hydrogen peroxide and from about 0.003 percent to 3 percent, by weight of the monomer, of an alkali metal formaldehyde sulfoxylate are employed as the catalyst system.

3. The process of claim 1 wherein the reaction temperature is within the range of 100° F. to 160° F.

4. The process of claim 1 wherein the alkali metal salt of a sulfated fatty alcohol of 8–18 C atoms is sodium lauryl sulfate, employed in an amount ranging from 0.25 percent to 0.45 percent, based on the weight of monomer.

5. The process of claim 1 wherein from 0.15 percent to 2.0 percent of tallow fatty alcohol is employed, based on the weight of monomer.

6. The process of claim 1 wherein a $C_{8-12}$ alkyl alkoxylated phosphate ester is employed.

7. The process of claim 6 wherein the $C_{8-12}$ alkyl alkoxylated phosphate ester is linear octyl ethoxylated phosphate monoester, sodium salt.

8. The process of claim 1 wherein a $C_{8-12}$ alkyl phenyl polyalkoxylated phosphate ester is employed.

9. The process of claim 8 wherein the $C_{8-12}$ alkyl phenyl polyalkoxylated phosphate ester is nonyl phenyl polyethoxylated phosphate.

10. The process of claim 1 wherein the monomer is a mixture of vinyl chloride with up to 50 percent, by weight of the mixture, of at least one other monomer copolymerizable with vinyl chloride.

11. The process of claim 16 wherein the complex organic phosphate ester or salt derivative thereof is employed in proportion to the alkali metal salt of a sulfated fatty alcohol of 8–18 C atoms per molecule in a ratio ranging between 0.35 to 0.40:1.00.

References Cited

UNITED STATES PATENTS

| | | | |
|---|---|---|---|
| 2,674,593 | 4/1954 | Condo et al. | 260—92.8 |
| 2,853,471 | 9/1958 | Beadel | 260—29.6 |
| 3,300,423 | 1/1967 | Brown et al. | 260—29.6 |
| 3,317,495 | 5/1967 | Jones et al. | 260—92.8 |
| 3,370,028 | 2/1968 | DeWald | 260—92.8 |

OTHER REFERENCES

Smith, W. M.: Vinyl Resins, 1958. Reinhold Publishing Corporation, New York, pp. 96–98.

JOSEPH L. SCHOFER, Primary Examiner

J. A. DONAHUE, JR., Assistant Examiner

U.S. Cl. X.R.

260—80.6, 86.3, 87.1, 92.8 W, 92.8 A

UNITED STATES PATENT OFFICE
CERTIFICATE OF CORRECTION

Patent No. 3,642,740  Dated February 15, 1972

Inventor(s) John K. Pierce, Jr.

It is certified that error appears in the above-identified patent and that said Letters Patent are hereby corrected as shown below:

Column 12, first line of Claim 11, for "16", read --1--.

Signed and sealed this 13th day of June 1972.

(SEAL)
Attest:

EDWARD M. FLETCHER, JR.  
Attesting Officer

ROBERT GOTTSCHALK  
Commissioner of Patents